United States Patent [19]

Hartmann

[11] 3,902,222

[45] Sept. 2, 1975

[54] FILLETING OF FISH

[75] Inventor: Franz Hartmann, Up Den Pahl, Germany

[73] Assignee: Nordischer Maschinenbau Rud. Baader, Lubeck, Germany

[22] Filed: Apr. 5, 1974

[21] Appl. No.: 458,090

[30] Foreign Application Priority Data

Apr. 7, 1973 Germany .......................... 2317622

[52] U.S. Cl. .......................... 17/46; 17/52; 17/56; 17/57

[51] Int. Cl.[2] .......................... A22C 25/16

[58] Field of Search .................... 17/57, 56, 52, 46

[56] References Cited

UNITED STATES PATENTS 3,525,120 8/1970 Jobmann .......................... 17/57

3,570,048 3/1971 Michael .......................... 17/56

FOREIGN PATENTS OR APPLICATIONS 83,842 7/1957 Denmark .......................... 17/52

*Primary Examiner*—Louis G. Mancene
*Assistant Examiner*—James D. Hamilton
*Attorney, Agent, or Firm*—Edward F. Levy

[57] ABSTRACT

During the filleting of fish, the fish is subjected to cuts which separate the belly spines in the tail region from the remainder of the flesh of the fish. Cuts are also made on the dorsal sides of the ribs and vertebral appendages. Thereafter, the belly flaps are turned outwards and backwards towards the dorsal side of the fish and a further cut is made on each side through double layers of belly flap in order to remove wedge-shaped pieces of belly flap which contain the pin bones.

4 Claims, 6 Drawing Figures

19
11
15
10
18
20

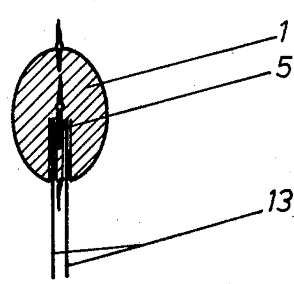
Fig. 1
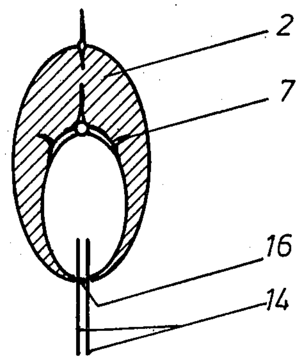
Fig. 2
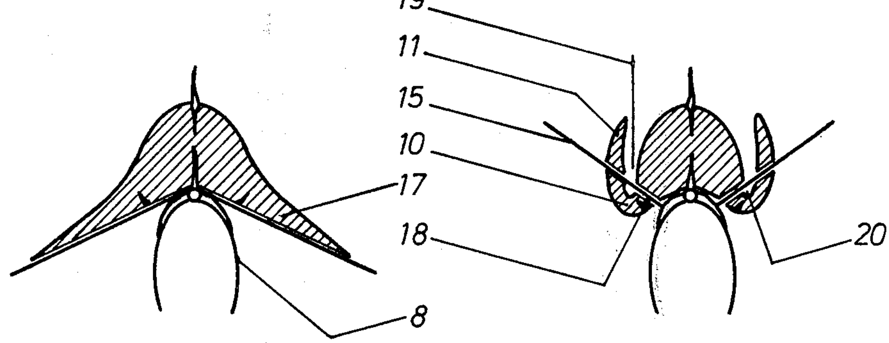
Fig. 3
Fig. 4
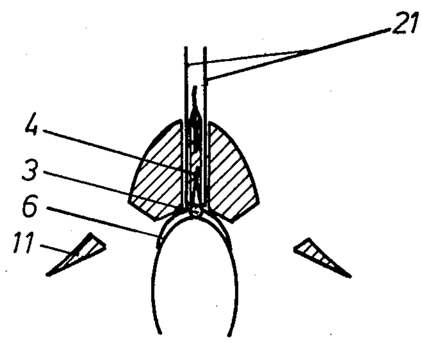
Fig. 5
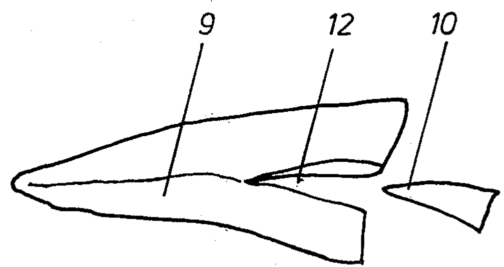
Fig. 6

FILLETING OF FISH

BACKGROUND OF INVENTION

This invention relates to a method of filleting fish and, in particular, the removal of pin bones.

British Patent Specification No. 1179364 discloses a method of producing fish fillets which are substantially free of bones and in which the belly cavity of the fish is cut open to produce belly flaps which are independent of one another. The belly flaps in the zone of the pin bones are cut off, with the pin bones, by a pair of cuts. Whilst this method tends to produce fillets which are completely free of pin bones, this advantage is counteracted by a substantial disadvantage in that high losses of valuable flesh occur.

German Patent Specification No. 1454082 also discloses a method of producing fish fillets which are substantially free of pin bones. The pin bones are first cut free prior to filleting by two cuts in the zone of the belly cavity on each side of the fish, close to the lower vertebral appendages, followed by further cuts which extend from the back, from the belly and from the flanks. This involves an accurate mounting of the fish on the underside of their back bones and, moreover, if the two cuts which are made on each side are closely adjacent one another, there is a risk of pin bones remaining in the resulting fillets.

SUMMARY OF THE INVENTION

It is a principal object of the present invention to provide a simple method of producing bone-free fish fillets.

According to the invention, a method of filleting fish includes making a pair of rib cuts in the belly cavity region of the fish on the dorsal sides of the ribs and vertebral appendages, thereafter bending the belly flaps outwards and towards the dorsal sides of the fish about the region of the pin bones, and making a further cut on each side through double layers of belly flap in order to remove wedge shaped pieces of belly flap which contain the pin bones.

A further cut on each side may be approximately parallel to the plane of the rib cut on the opposite side. This method has the great advantage that a substantial part of the belly flaps remains part of the final fish fillet, whilst the pin bones are reliably removed with the wedge shaped pieces of belly flap.

According to a further embodiment of the invention the outwardly bent belly flaps remain supported from the outside. According to another embodiment of the invention the upwardly bent belly flaps remain depressed at the bending or folding position. The advantages achieved by both measures are due to the fact that the belly flaps can remain under reliable control while the pin bone strip is cut out. According to one preferred embodiment of the invention the length and/or the width of the fish bone strip can be controlled by altering the external support means of the belly flaps and according to another advantageous embodiment of the invention the length and/or width of the fish bone strip can be controlled by altering the downward pressure and/or according to a further particular embodiment by displacing the distance of the plane of the pin bone cut from the back vertebrae.

According to one suitable embodiment of the invention the length of the fish bone cut is controlled optionally by varying the time during which support is applied or the time during which depression is applied or by a combination of both while according to another advantageous embodiment of the invention the width of the fish bone cut is controlled optionally by the depth of depression, by the reduction of the support action or by a combination of both.

According to one possible embodiment of the invention the length and/or width of the fish bone strip is controlled in dependence on a measurement of the size of the fish while in a preferred embodiment of the invention the width of the fish bone strip is controlled in dependence on size and control of the length of the fish bone strip is applied in dependence on the time during which the fish passes by the operating position.

DESCRIPTION OF THE DRAWINGS

The invention may be carried into practice in various ways but one specific embodiment will now be described by way of example with reference to the accompanying diagrammatic drawings, in which:

FIG. 1 is a cross-section through the tail part of the fish when the belly spine cuts are performed;

FIG. 2 is a cross-section through the belly part of the fish when the belly cuts are performed;

FIG. 3 is a cross-section through the belly part of the fish when the rib cuts are performed;

FIG. 4 is a cross-section through the belly parts of the fish while the pin bone cuts are performed;

FIG. 5 is a cross-section through the belly part of the fish while the back cuts are performed; and, FIG. 6 is a plan view of the outside of the right hand fillet of a fish.

DESCRIPTION OF THE PREFERRED EMBODIMENT

A be-headed fish with its belly side facing downwardly is conveyed in a straight path, by being gripped on its sides, over one or more pairs of circular knives which are parallel or are inclined to each other and are adapted to cut out a narrow belly strip 16 from its belly parts 2 according to FIG. 2 and are adapted, according to FIG. 1, to perform two belly spine cuts 13 in the tail part 1 adjacent to the belly spines 5 and extending as far as the back bone 3. During the ensuing feed motion and according to FIG. 3, two rib cuts are made by a pair of further circular knives which are inclined at an angle of approximately 130° to each other and by means of which the belly flaps 17 and the pin bones 7 disposed therein are cut off from the ribs 8 and the vertebral appendages 6. According to FIG. 4 the belly flaps 17 are then upwardly bent about the position 18 at which the pin bones 7 are separated from the vertebral appendages 6 or are folded against the back sides of the fish. A pin bone strip 10 which contains the pin bones is cut from each of the belly flaps 17 in the zone of the belly cut by the application of a pin bone cut 15. Each of the pin bone cuts 15 is disposed in a plane which is approximately parallel to that of the oppositely disposed rib cut but is offset from the back bone 3 on the opposite side. A pin bone strip 10 which is removed by these cuts has a wedge shaped appearance in plan view — as shown by FIG. 6 — and its width increases from the belly cavity end towards the head.

In order to enable the fish bone strips 10 to be cut out in the desired manner, immediately prior to the cuts 15 being made, they are supported from the outside by means not shown and the belly flaps are pressed down at the fold position by an element 19. The pressing operation is performed downwardly from above and appropriately in planes which are approximately parallel to the plane of symmetry of the fish, while the supporting action is for example performed by elements lying below and parallel to the planes of the pin bone cuts 15. The supporting and pressing down actions enable the belly flaps of the fish to be controlled so that they enable the length as well as the width of the pin bone strips to be controlled. More intensive downward pressure results in a broader fish bone strip while early downward pressure results in a longer fish bone strip and stronger support reduces the width of the pin bone strip and earlier release causes the pin bone strip to become longer. Close adaptation to the different position and extension of the pin bones in different kinds of fish can be obtained by the combination of the control facilities thus obtained and it is possible for the magnitude of the control path to be derived without difficulty from one dimension of the fish.

Removal of the pin bone strip can be controlled with the greatest reliability if the width is controlled in dependence on one dimension of the fish and the length of the strip is controlled in dependence on the time during which the fish or parts thereof pass by the operating position.

In a particularly simple control system, as the belly cavity end passes a measuring probe the support of the belly flaps is released outwardly and the support means employed for this purpose, being movable in the plane of the pin bone cuts 15, opens slowly, pressing down being effected solely by the gravity effect of the means used for the purpose.

The filleting operation is completed according to FIG. 5 when the fish fillets 9, which have the wedge-shaped cut outs 12, are cut off by a pair of back cuts 21 which are performed adjacent to the back bones 4. FIG. 6 illustrates in plan a right hand fish fillet 9 treated in this manner, together with the cut out pin bone strip 10 and the cut out 12 produced by the pin bone cut 15. The pin bone strip can be utilised without any after treatment for bone-free fish products.

It is immaterial for performing the method whether the fishes are conveyed with the belly facing down or up, with the head leading or the tail leading. However, the fish are conveyed, prior to the pin bone cuts 15, by being gripped from the outsides of the flanks while during and after the fish bone cuts the fish are conveyed by being gripped on the internal bone structure of the fish, or by gripping its back. Feed saddles with two rows or spikes or circulating endless conveyors having spikes which act directly on the vertebrae of the back bone have been found particularly advantageous as conveying means.

For different kinds of fishes it is possible for the position of the rib cuts as well as the position of the pin bone cuts to deviate so that the planes of the pin bone cuts need not be parallel to those of the oppositely disposed rib cuts and may include (with respect thereto) angles of, for example 0°– 15°.

What I claim as my invention and desire to secure by letters Patent is:

1. A method of filleting fish which includes the steps of making a pair of closely-spaced belly spine cuts extending longitudinally of the fish body on either side of the belly spine, making a pair of rib cuts in the belly cavity region of the fish on the dorsal sides of the ribs and vertebral appendages to form a pair of individual belly flaps, each separated from the ribs and vertebral appendages and each containing the pin bones of the fish, thereafter bending the belly flaps outwardly and towards the dorsal sides of the fish about the region of the pin bones to provide in each belly flap a double layer joined by a fold, and then making a further cut on each side of the fish through the double layer of each bent belly flap above said fold in order to separate from the fish wedge shaped pieces of belly flap which contain the pin bones.

2. A method as claimed in claim 1 wherein the further cut on each side is approximately parallel to the plane of the rib cut on the opposite side.

3. A method as claimed in claim 1, in which the bent belly flaps are supported from the outside while the further cut is made on each side.

4. A method as claimed in claim 1, in which the belly flaps are bent in one direction and thereafter pressure is applied in the region of the bend in the opposite direction immediately before the further cuts are made.

* * * * *